United States Patent [19]
Lebby et al.

[11] Patent Number: 5,337,397
[45] Date of Patent: Aug. 9, 1994

[54] OPTICAL COUPLING DEVICE AND METHOD FOR MAKING

[75] Inventors: Michael S. Lebby, Apache Junction; Christopher K. Y. Chun, Mesa; Shun-Meen Kuo, Chandler; Davis H. Hartman, Phoenix, all of Ariz.

[73] Assignee: Motorola, Inc., Schaumburg, Ill.

[21] Appl. No.: 72,373

[22] Filed: Jun. 7, 1993

[51] Int. Cl.$^5$ .............................. G02B 6/00; G02B 6/36
[52] U.S. Cl. ............................................. 385/93; 385/33
[58] Field of Search ................................ 385/88–94, 385/31, 33, 39, 41, 42, 43, 51, 52, 129, 130, 132

[56] References Cited

U.S. PATENT DOCUMENTS

| | | | |
|---|---|---|---|
| 4,433,898 | 2/1984 | Nasiri | 385/93 X |
| 4,616,899 | 10/1986 | Schlafer | 385/93 |
| 4,834,494 | 5/1989 | DeMeritt et al. | 385/33 |
| 5,101,457 | 3/1992 | Blonder et al. | 385/93 X |
| 5,107,537 | 4/1992 | Schriks et al. | 385/93 X |
| 5,127,074 | 6/1992 | Watanabe et al. | 385/93 |
| 5,175,783 | 12/1992 | Tatoh | 385/93 |
| 5,177,803 | 1/1993 | Newhouse et al. | 385/43 |
| 5,185,824 | 2/1993 | Grims et al. | 385/19 |
| 5,201,018 | 4/1993 | Coden et al. | 385/93 X |
| 5,257,336 | 10/1993 | Dautartas | 385/93 |

*Primary Examiner*—Akm E. Ullah
*Attorney, Agent, or Firm*—Gary F. Witting; Eugene A. Parsons

[57] ABSTRACT

A core region (107) with an end (114) and a cladding region (108) is formed. The cladding region (108) surrounds the end (114) of the core region (107) forming a surface (119) having a lens device (102) therein. The end (114) of the core region (107) is positioned with a selected distance (118) from the lens device (102) to the end (114) of the core region (107) of the waveguide (101). A light emitting device (103) having a working portion (104) is mounted on the surface (119) of the cladding region (108) with the working portion (104) of the light emitting device (103) directed over the lens device (102) for collection and focusing of light (109) from the working portion (104) of the light emitting device (103) into the end (114) of the core region (107).

15 Claims, 2 Drawing Sheets

OPTICAL COUPLING DEVICE AND METHOD FOR MAKING

BACKGROUND OF THE INVENTION

This invention relates, in general, to fabrication of optical devices and, more particularly, to fabrication of a lens device with a core region of an optical waveguide.

This application is related to U.S. Pat. No. 5,265,184, issued on Nov. 23, 1993, having application Ser. No. 889,335, now U.S. Pat. No. 5,265,184, titled "MOLDED WAVEGUIDE AND METHOD OF MAKING SAME", and filed on May 28, 1992.

At present, coupling of a light emitting device to a core region of a waveguide is a difficult task that typically is achieved by either a manual method or a semi-automatic method. Generally, both the manual and the semi-automated methods are complex, inefficient, and are not suitable for high volume manufacturing.

A major problem associated with the coupling of the light emitting device to the core region of the waveguide is alignment of a working portion of the light emitting device to the core region of the waveguide. Moreover, it should be pointed out that the working portion of the light emitting device generally is required to be not only perpendicular, but also to be within an area described by a surface of the core region of the waveguide so as to allow light from the working portion to enter the core region of the waveguide, thus necessitating extremely tight alignment tolerances between the working portion of the light emitting device and the core region of the waveguide.

In the prior art, coupling of the optical device and the core region of the waveguide typically is achieved by carefully aligning an activated light emitting device to the core region of the waveguide by hand, commonly called active alignment, and subsequently cementing or adhering the light emitting device to the core region of the waveguide. However, many problems arise by aligning the light emitting device and the core region of the waveguide by hand, such as being extremely labor intensive, being costly, having a potential of poor accuracy of the alignment, and the like. Further, if the misalignment is severe enough, unsuitable product is manufactured, thus increasing cost and reducing manufacturing capacity.

It can be readily seen that the prior art methods for connecting an optical device to a waveguide have severe limitations. Also, it is evident that the prior art fabrication methods or interconnection between the optical device and the waveguide are not only complex and expensive, but also not amenable to high volume manufacturing. Therefore, a method for interconnecting an optical device to a core region of an optical waveguide that is cost effective and simplistic is highly desirable.

SUMMARY OF THE INVENTION

Briefly stated, a method is provided for coupling a light emitting device to a core region of an optical waveguide. An optical waveguide having a core region with an end and a cladding region is formed. The cladding region surrounds the end of the core region, as well as forming a surface having a lens device thereon. The end of the core region is positioned to provide a selected distance from the lens device to the end of the core region of the waveguide. A light emitting device having a working portion is mounted on the surface of the cladding region with the working portion of the light emitting device directed over the lens device for collection and focusing of light from the working portion of the light emitting device into the end of the core region.

An advantage of the present invention is to relax alignment tolerances between the working portion of the light emitting device and the core region of the waveguide.

Another advantage of the present invention is to provide a more manufacturable process.

DETAILED DESCRIPTION OF THE DRAWINGS

Figure 1:
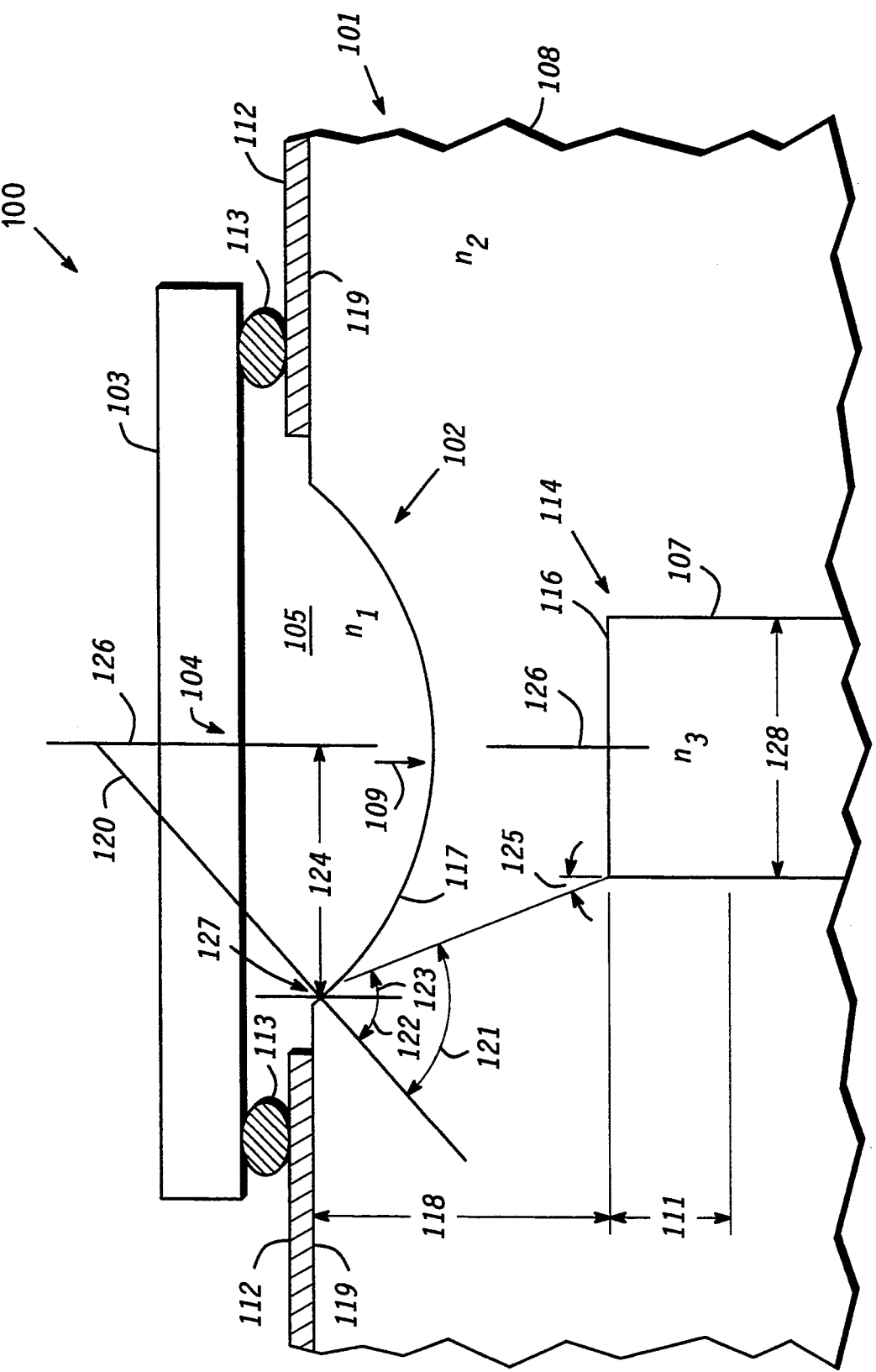
FIG. 1 is a greatly enlarged partial cross-sectional view of an optical coupling device.

FIG. 1 is an enlarged simplified partial cross-sectional view of an optical coupling device 100. It should be understood that FIG. 1 is a cross-sectional view through a waveguide or optical waveguide 101, a light emitting device 103, a space 105, conductive tracks 112, and conductive bumps 113 indicated by arrows 1—1 of FIG. 2. It should be further understood that FIG. 1 is a cross-sectional view and that waveguide 101 and light emitting device 103 extend both into and out of the drawing. Additionally, while light emitting device 103 is shown to be a single light emitting device, it should be understood that light emitting device 103 is capable of being an array of light emitting devices. In the present invention, a combination of elements and processes are described that allows for accurate and efficient interconnection or coupling of a working portion 104 of light emitting device 103 to a core region 107 of waveguide 101 by relaxing alignment tolerances.

Generally, waveguide 101 is made utilizing the teachings of U.S. Pat. No. 5,265,184 issued on Nov. 23, 1993, titled "MOLDED WAVEGUIDE AND METHOD OF MAKING SAME", filed on May 28, 1992.

Briefly, waveguide 101 is made with core region 107 having an end 114 with a surface 116 that is surrounded by a cladding region 108. Cladding region 108 further defines a surface 119 that is capable of having a lens device 102 either placed thereon or placed therein. Generally, waveguide 101 is made by any suitable method, such as molding, milling, or the like. However, in a preferred embodiment of the present invention, waveguide 101 is made by molding, thereby ensuring precise and accurate orientation of the core region 107 to surface 119 of cladding region 108.

Typically, both core region 107 and cladding region 108 are made of a hard optically transparent polymer each having a refractive index, indicated by $\eta_3$ and $\eta_2$ respectively. The refractive index of core region 107 is at least 0.01 higher than the refractive index of cladding region 108, thus allowing effective and efficient transmission or guiding of light through core region 107 of waveguide 101. Additionally, it should be understood that the hard optically transparent polymer used for making cladding region 108 is capable of having additives, such as silicones, silicates, and the like placed into the polymer so as to improve structural characteristics, such as strength, resistance to thermal heat cycling, long term stability, and the like. However, it should be understood that the addition of these additives need to be selected and incorporated in cladding region 108 such that optical parameters of lens device 102 are not significantly effected.

Lens device 102 is capable of being any suitable lens device, such as a concave lens, a convex lens, a binary lens, a diffraction grating, or the like. Further, lens device 102 is made by any suitable method, such as molding, milling, or the like. However, in a preferred embodiment of the present invention, lens device is molded in conjunction with core region 107 and cladding region 108, thereby ensuring accurate and precise positioning of lens device 102 in relation to surface 116 of core region 107.

Light emitting device 103 is an optical transmitter that emits light, indicated by arrows 109, from working portion 104 through space 105 toward core region 107 of waveguide 101. Light emitting device 103 is capable of being any suitable light emitting device, such as a light emitting diode (LED), a vertical cavity surface emitting laser (VCSEL), or the like. However, in a preferred embodiment of the present invention, light emitting device 103 uses a VCSEL to emit light from working portion 104 to core region 107 of waveguide 101.

Generally, light emitting device 103 is made separately and subsequently electrically and mechanically joined to waveguide 101 by any suitable method, such as manually, semi-automatically, fully automatically, In a preferred embodiment of the present invention, light emitting device 103 is joined to waveguide 101 using an automatic system such as a robotic arm (not shown). However, since lens device 102 is used to focus and direct light 109 from working portion 104 of light emitting device 103, extremely accurate and expensive robotic arms are not used since alignment tolerances of working portion 104 of light emitting device 103 to core region 107 are relaxed, thus making optical coupling device 100, as a whole more manufacturable and less costly.

Electrical signals that stimulate working portion 104 of light emitting device 103 are sent through conductive tracks 112. Conductive tracks 112 are made by any suitable well-known method in the art. The electrical signals are then passed through conductive bumps 113 to light emitting device 103. Conductive bumps 113 are made by any suitable method well known in art, such as solder bumps, gold bumps, conductive epoxy bumps, or the like. However, in a preferred embodiment of the present invention, gold bumps are used to provide a secure mechanical and electrical connection between conductive tracks 112 and light emitting device 103.

Referring now more specifically to lens device 102 and associated optical regions, in a preferred embodiment of the present invention, lens apparatus 102 is a concave lens which diffracts light from anywhere on lens surface 117 into surface 116 of core region 107, thus allowing working portion 104 to be misaligned by a distance 124 while still projecting light 109 from working portion 104 into core region 107.

For example, with refractive indexes of core region 107, cladding region 108, and space 105 being known, and with a selected distance 118 being chosen, radius 120 that describes a surface 117 of lens device 102 is determined by solving the following set of equations.

First, setting angle $\Theta_x$ equal to a sum of angle $\Theta_{2B}$ and angle $\Theta_1$, represented by arcs 121, 123, and 122, respectively, is represented by the following mathematical equation:

$$\Theta_x = \Theta_{2B} + \Theta_1$$

An acceptance angle or $\Theta_{2B}$ is determined for surface 116 of end 114 by using the following equation:

$$\Theta_{2B} = \sin^{-1}\left[\frac{n_3}{n_2}\cos\left(\sin^{-1}\frac{n_2}{n_3}\right)\right]$$

Refractive indexes of core region 107 and cladding region 108 are well-known material constants that are identified as $n_3$ and $n_2$, respectively. Solving for $\Theta_{2B}$ results in determination of the acceptance angle, represented by arc 123, for end 114. It should be understood that light 109 from working portion 104 is capable of being accepted into core region 107 from perpendicular to surface 116 to the calculated angle $\Theta_{2B}$, illustrated by arc 125. It should be understood that angles described by arc 123 and arc 125 are complementary angles; therefore, the angles described by arc 123 and arc 125 are equal. However, it should be further understood that acceptance angle $\Theta_{2B}$ extends along a perimeter (not shown) of surface 116 of end 114, thereby generating a cone (not shown) that allows light 109 to be captured by core region 107 and subsequently guided by core region 107.

Second, $\Theta_1$ is determined or calculated by using the following equation:

$$\Theta_1 = \tan^{-1}\left[\frac{\sin\Theta_{2B}}{\frac{n_1}{n_1} - \cos\Theta_{2B}}\right]$$

Refractive indexes of cladding region 108 and space 105 are well-known material constants that are identified as $n_2$ and $n_1$, respectively. $\Theta_{2B}$ has been determined hereinabove. By substituting known refractive indexes of core region 107, cladding region 108, and the calculated value for $\Theta_{2B}$, $\Theta_1$ is determined or calculated with the equation hereinabove. Additionally, it should be understood that space 105 is capable of being filled with a variety of materials, such as air, plastic, epoxy, or the like. It should be further understood that each material that fills space 105 has a refractive index. For example, air has a refractive index of 1.0 and epoxies have a refractive index of approximately 1.56.

Third, once $\Theta_1$ and $\Theta_{2B}$ have been determined, a distance 124, represented by x in the below equation, is determined by the following equation:

$$x = h\tan(\Theta_{2B}) + \frac{d}{2}$$

Width 128, represented by d in the above equation, is the distance across surface 116. A selected distance 118, represented by h in the above equation, is the distance between surface 119 of cladding region 108 and surface 116 of core region 107. Selected distance 118 is arbitrarily selected. However, in a preferred embodiment of the present invention, selected distance 118 ranges from 2.0 mills to 20.0 mills. By substituting previously determined or calculated values and distance 118 in the above equation, a distance 124, represented by x in the above equation, that extends from a midpoint 126 of surface 116 to a corner 127 of lens device 102 is solved.

Fourth, radius 120 is now capable of being determined using the following equation:

$$r = \frac{x}{\sin(\Theta_1)}$$

Both x and $\Theta_1$ have been previously determined or calculated by the previously described equations. By substituting the previously calculated values, i.e., x and $\Theta_1$ into the above equation a value r that is a radius 120 is determined. Radius 120 defines an arc that determines surface 117 of lens device 102. By utilizing the present invention in conjunction with the equations presented hereinabove, a lens device having surface 117 is formed that enables alignment tolerances of light emitting device 103 to be relaxed for greater manufacturability and placement of light emitting device 103 to core region 107. Further, by relaxing alignment tolerances between working portion 104 of light emitting device 103 to core region 107, cost of manufacturing optical coupling device is substantially dropped, as well as increasing quality of optical coupling device 100.

Further, it should be understood that surface 116 of core region 107 is capable of being formed in cladding region 108 with respect to lens device 102 with a range of distances 111 that is described in accordance with the following equation.

$$\Delta = \frac{d}{\tan(\Theta_{2B})}$$

Range of distances 111 at which surface 116 is capable of being formed is represented by $\Delta$ in the above equation. Width 128 is represent by d in the above equation. Acceptance angle or $\Theta_{2B}$ has been previously calculated. By substituting in known values and previously determined or calculated values, distance 111 or the range of distances at which surface 116 is capable of being formed is determined.

By way of example only, with $n_1$, $n_2$, and $n_3$ being equal to 1.56, 1.52, and 1.56, respectively, with selected distance 118 being 10.0 mils, and with core region 107 having width 128 being 2 mils, radius 120 is determined in the following manner.

First, $\Theta_{2B}$ is determined by using the following equation with substituted known values:

$$\Theta_{2B} = \sin^{-1}\left[\frac{1.56}{1.52}\cos\left(\sin^{-1}\frac{1.52}{1.56}\right)\right]$$

resulting in $\Theta_{2B}$ being equal to 13.35 degrees.

Second, $\Theta_1$ is determined by using the following equation with substituted known values:

$$\Theta_1 = \tan^{-1}\left[\frac{\sin 13.35}{\frac{1.56}{1.52} - 13.35}\right]$$

resulting in $\Theta_1$ being equal to 76.99 degrees.

Third, distance 124, represented by x in the below equation, is calculated by using the following equation with substituted known values:

$$x = 10.0 \text{ mils } \tan(13.35) + 1$$

resulting in distance 124 being equal to 3.37 mils.

Fourth, radius 120, represented by r in the below equation, is capable of being determined or calculated by using the following equation with substituted known values:

$$r = \frac{3.37 \text{ mils}}{\sin(76.99°)}$$

resulting in radius 120 being equal to 3.46 mills.

With core region 107 having width 128 being 2.0 mils, the alignment tolerance has been increased a total of 6.74 mils or 3.37 on each side of core region 107, thereby relaxing the alignment tolerance by approximately a factor of three on each side of core region 107.

Fifth, range of distances 111, represented by $\Delta$ is determined by the following equation with substituted known values.

$$\Delta = \frac{2.0 \text{ mils}}{\tan(13.35)}$$

resulting in $\Delta$ or range of distances 111 being equal to 8.43 mils.

Figure 2:
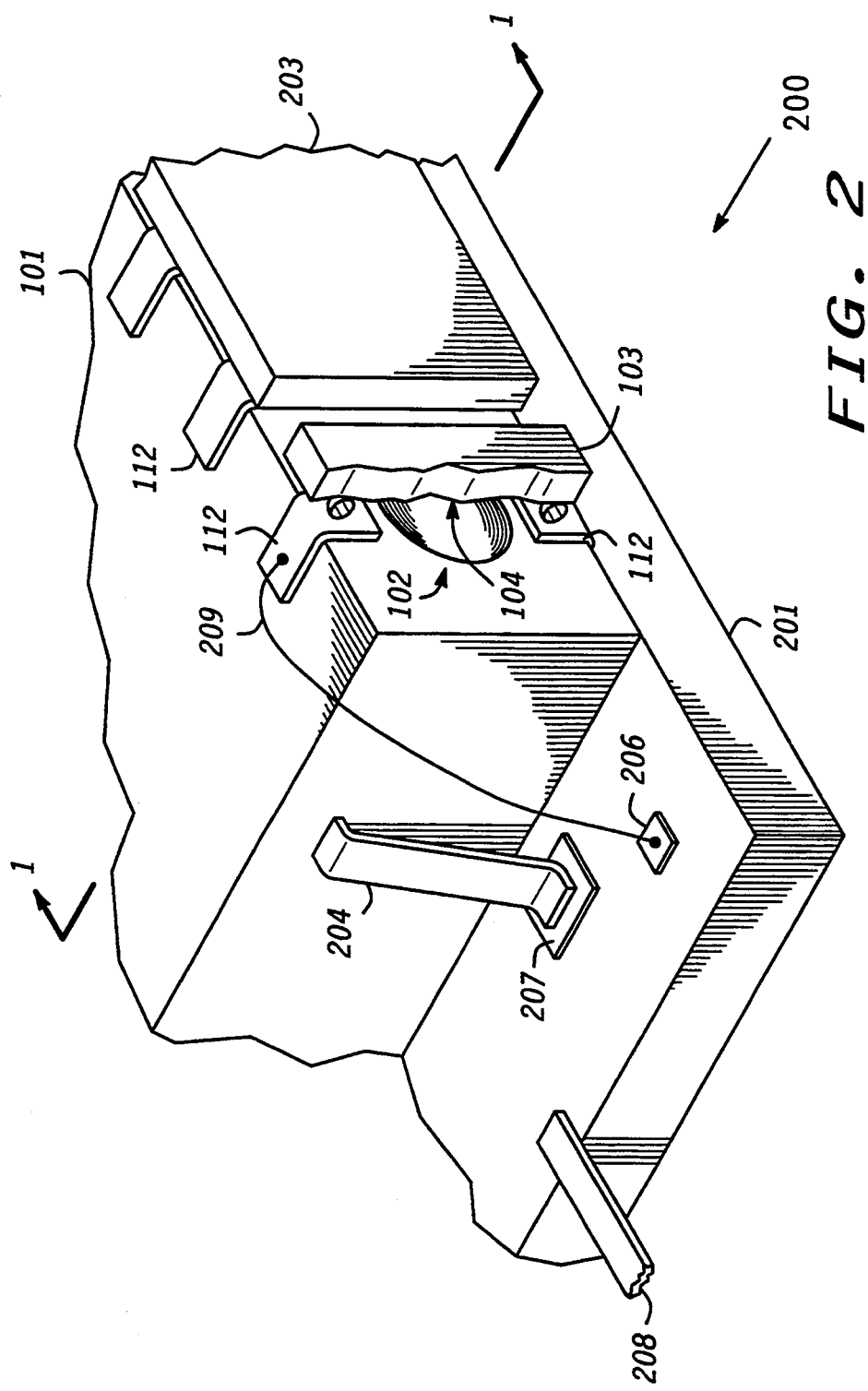
FIG. 2 is a greatly enlarged perspective view of a partial optical coupling device mounted on an interconnect board.

FIG. 2 is a greatly enlarged perspective view of a partial optical module 200 using a variety of optical coupling devices mounted on an interconnect board 201. It should be understood that similar features having similar functions or identical functions will retain their original identification numerals as set forth in FIG. 1. In the present invention, waveguide 101 is electrically coupled to standard electronic components (not shown) on interconnect board 201, thus incorporating standard electronic components such as integrated circuits, capacitors, and the like to light emitting device 103 or to an array of light emitting devices 203.

In the present invention, waveguide 101 is capable of being fitted with either individual light emitting device 103 or array of light emitting devices 203. However, it should be understood that other photonic devices (not shown) such as photo-detectors are capable of being intermixed with the light emitting devices 103, 203 so that waveguide 101 is capable of both photo-transmitting and photo-receiving. As illustrated in FIG. 2, portions of light emitting device 103 are broken away so that a similar illustration as in FIG. 1 can be seen. As can be seen in FIG. 2, working portion 104 of light emitting device 103 is positioned and mounted over lens device 102, thus illustrating the relaxed alignment tolerances with lens apparatus 102 of waveguide 101.

Additionally, it should be pointed out that conductive tracks 112 are capable of being built into or embedded into waveguide 101 as illustrated by embedded conductive track 204.

Electrical interconnection between conductive tracks 112 or embedded conductive tracks 204 is achieved by any suitable method, such as wire bonding, tab bonding, or the like. However, it should be understood in the preferred embodiment of the present invention, using conductive tracks 112 wire bonding, illustrated by wire bond 209, is used to interconnect conductive tracks 112 to a bonding pad 206 that is further interconnected with standard electronic components. Alternatively, in another embodiment of the present invention, embedded conductive track 204 is bonded to bonding pad 207 by any suitable method such as tab bonding, solder bonding, or the like. However, in a preferred embodiment of the present invention, use of embedded conductive lead 204 is solder bonded with an automated system to interconnect embedded conductive track 204 to the standard electronic components.

Further it should be understood that both bonding pads 206 and 207 are capable of being directly coupled to a lead frame, illustrated by lead frame member 208. Moreover, it should be understood that while only one lead frame member is illustrated a plurality of lead frame members are capable of being used to interconnect optical module 200 with other standard electronic components.

Additionally, it should be understood that optical module 200 is capable of being over molded or packaged, thereby forming a packaged product (not shown) that contains optical module 200.

By now it should be appreciated that a novel optical coupling device and method of making same has been described. The optical coupling device incorporates a lens system into the cladding layer thereby providing relaxed alignment tolerances that result in a cost effective manner of manufacturing. Additionally, the method of making the optical couple device allows for the incorporation of standard electronic components with photonic devices in a highly manufacturable process.

What is claimed is:

1. A method for coupling a light emitting device to a core region of an optical waveguide comprising the steps of:
    forming an optical waveguide having a core region with an end and a cladding region, the cladding region surrounding the end of the core region forming a surface, the surface of the cladding region forming a lens device, the end of the core region being positioned to provide a selected distance from the lens device to the end of the core region; and
    mounting a light emitting device having a working portion on the surface of the cladding region of the optical waveguide with the working portion of the light emitting device directed over the lens for collecting and focusing of light from the working portion to the end of the core region.

2. A method for coupling a light emitting device to a core region of an optical waveguide as claimed in claim 1 wherein the step of forming the optical waveguide is accomplished by molding the optical waveguide.

3. A method for coupling a light emitting device to a core region of an optical waveguide as claimed in claim 1 wherein the step of forming of the optical waveguide the selected distance ranges from 2 mills to 20 mills.

4. A method for coupling a light emitting device to a core region of an optical waveguide as claimed in claim 1 wherein the step of mounting the light emitting device includes mounting a laser.

5. A method for coupling a light emitting device to a core region of an optical waveguide as claimed in claim 4 wherein the step of mounting a laser includes mounting a VCSEL.

6. A method for coupling a light emitting device to a core region of an optical waveguide as claimed in claim 1 wherein the step of forming the lens device includes forming a holographic lens from the surface of the cladding region.

7. An optical coupling device comprising:
    a molded optical waveguide having a core region with an end and a cladding region, the cladding region surrounding the end of the core region forming a surface and an end surface, the cladding region surrounding the end surface being formed into a lens device, wherein the end of the core region is positioned with a predetermined distance from the lens device to the end of the core region;
    a plurality of electrical tracings disposed on the surface of the waveguide; and
    a light emitting device having a working portion mounted on the edge surface of the molded optical waveguide to operably couple the working portion of the light emitting device to the lens device.

8. An optical coupling device as claimed in claim 7 wherein the light emitting device is a laser.

9. An optical coupling device as claimed in claim 8 wherein the laser is a vertical cavity surface emitting laser.

10. An optical coupling device as claimed in claim 7 wherein the lens device is a concave lens.

11. An optical coupling device as claimed in claim 7 wherein the lens device is a convex lens.

12. An optical coupling device as claimed in claim 7 wherein the lens device is a holographic lens.

13. A method for improving process latitude for aligning a light emitting device to a core region of a waveguide comprising the steps of:
    forming an optical waveguide having a core region with an end and a cladding region, the cladding region surrounding the end of the core region and forming a surface, the end of the core region being positioned at a selected distance from the surface of the cladding region; and
    forming a lens device from the surface of the cladding region for directing light from the lens device to the end of the core region within a range of acceptance angles, thereby operably coupling the lens device to the end of the core.

14. A method for improving process latitude for aligning a light emitting device to a core region of a waveguide as claimed in claim 13 further comprising the step of:
    mounting a light emitting device having a working portion on the surface of the cladding region with the working portion of the light emitting device directed over the lens for collecting and focusing of light from the working portion to the end of the core region.

15. A method for improving process latitude for aligning a light emitting device to a core region of a waveguide as claimed in claim 13 wherein the step of forming the lens device includes forming an optical concave surface from the surface of the cladding region.

* * * * *